United States Patent [19]

Hlawatschek

[11] Patent Number: 4,760,039

[45] Date of Patent: Jul. 26, 1988

[54] REFRACTORY COMPOSITION AND REFRACTORY UNFIRED SHAPES PRODUCED THEREFROM

[75] Inventor: Hartmut Hlawatschek, Mainz, Fed. Rep. of Germany

[73] Assignee: Didier-Werke AG, Wiesbaden, Fed. Rep. of Germany

[21] Appl. No.: 73,070

[22] Filed: Jul. 13, 1987

[30] Foreign Application Priority Data

Jul. 24, 1986 [DE] Fed. Rep. of Germany ....... 3625064
Feb. 3, 1987 [DE] Fed. Rep. of Germany ....... 3703136

[51] Int. Cl.$^4$ ............................................. C04B 35/06
[52] U.S. Cl. ...................................... 501/119; 501/118; 501/123; 501/125; 501/153; 501/128; 106/121
[58] Field of Search ................ 501/117, 119, 118, 128

[56] References Cited

U.S. PATENT DOCUMENTS

| | | | |
|---|---|---|---|
| 833,930 | 10/1906 | Jeroch | 106/105 |
| 3,232,774 | 2/1966 | Kehl | 501/117 X |
| 4,001,029 | 1/1977 | Cassens | 501/128 |
| 4,276,091 | 6/1981 | Cassens | 501/117 |

FOREIGN PATENT DOCUMENTS 2617587 4/1977 Fed. Rep. of Germany ...... 364/860

Primary Examiner—William R. Dixon, Jr.
Assistant Examiner—James M. Hunter, Jr.
Attorney, Agent, or Firm—Wenderoth, Lind & Ponack

[57] ABSTRACT

Refractory compositions which can be gun-applied, or refractory, unfired shapes containing sintered magnesite and/or sintered dolomite as the principal refractory component, 0.5 to 5% by weight of bentonite, 1 to 5% by weight of aluminum sulfate and 0.5 to 5% by weight of an alkaline earth compound, characterized by the fact that they contain magnesium hydroxide and/or caustic-calcined MgO as the alkaline earth compound. The compositions and shapes of the invention have the advantage that they do not exhibit binder migration, and no damping-reduction cracks or chipping occurs therein.

10 Claims, No Drawings

REFRACTORY COMPOSITION AND REFRACTORY UNFIRED SHAPES PRODUCED THEREFROM

FIELD OF THE INVENTION

The present invention relates to a refractory composition containing sintered magnesite and/or sintered dolomite as the principal refractory component, which when mixed with water can be gun-applied or formed into a refractory unfired shape.

DESCRIPTION OF THE PRIOR ART

West German Pat. No. 2,457,579 teaches MgO-based refractory compositions which contain, as binder, an organic acid such as citric acid, aluminum sulfate and, if necessary, a boron compound such as sodium borate or borax. Such compositions can be used as gun-applied compositions for the production of refractory coatings and linings.

Furthermore, West German Pat. No. 2,617,587 teaches MgO-based refractory compositions that contain an alkaline earth sulfate, aluminum sulfate, dissolved lime and bentonite.

In these prior art compositions, which can be gun-applied, the aluminum sulfate and the dissolved lime, i.e. $Ca(OH)_2$, serve as binders to cause rapid setting during the actual injection on hot surfaces, and do not chip from such hot surfaces.

The West German Pat. No. 2,617,587 also discloses the simultaneous use of periclase, i.e. sintered magnesite, and chromium ore.

However, a problem with the composition of West German Pat. No. 2,617,587 is that binder migration takes place in the composition.

SUMMARY OF THE INVENTION

An object of the present invention is to provide a refractory composition which can be gun-applied or formed into a refractory unfired shape, in which binder migration does not occur.

It has now been found that by using causticcalcined MgO, i.e. a magnesium oxide (MgO) which has not been entirely dead-burned, but forms an alkaline suspension with water, and/or by using magnesium hydroxide, i.e. $Mg(OH)_2$, refractory, gun-applied compositions can also be obtained, whereby no binder migration takes place in the compositions of the invention as in the case of the compositions taught by West German Pat. No. 2,617,587.

It has likewise been found that during injection molding, the compositions of the invention can be applied in layer thicknesses of more than 10 cm, and even with layer thicknesses above 20 cm, without forming damping-reduction cracks or chipping, and also that the refractoriness of the composition is enhanced by the absence of a calcium constituent.

It has also been found that it is possible to make in a simple manner from the composition of the invention, by adding an appropriate quantity of water, a mixture that can be shaped into a green article, i.e. formed but unfired ceramic bodies that are dimensionally stable and can be assembled together to form refractory linings and which are then set, i.e. fired, during use.

DETAILED DESCRIPTION OF THE INVENTION

Thus, the present invention provides a refractory composition which comprises a sintered material selected from the group consisting of sintered magnesite, sintered dolomite and a mixture thereof as the principal refractory component of said composition; 0.5 to 5% by weight of bentonite; 1 to 5% by weight of aluminum sulfate; and 0.5 to 5% by weight of an alkaline earth component selected from the group consisting of magnesium hydroxide, caustic-calcined MgO and a mixture thereof, all of said weight percentages being based on the weight of said composition.

In accordance with the indication above, it is preferably that the composition does not contain any added calcium constituent.

The compositions of the present invention contain, as principal refractory component, sintered magnesite and/or sintered dolomite, both of which are commercial products. Preferably, the composition contains at least 50% by weight, more preferably 50 to 95% by weight, of the sintered material, i.e. the sintered magnesite, sintered dolomite or mixture thereof, based on the weight of the composition. When a mixture of the sintered magnesite and sintered dolomite is used, any proportion of these materials is suitable. For example, the weight ratio of sintered magnesite to sintered dolomite in the mixture of these materials can be 1–99:99–1.

Furthermore, the composition of the invention also contains 0.5 to 5% by weight, and preferably 0.5 to 2.0% by weight, of bentonite. According to a preferred embodiment, the composition of the invention also contains, in addition to the bentonite, 0.5 to 4% by weight, based on the total weight of refractory components, of normal, relatively slightly swelling, refractory clay. The advantage of this embodiment lies in the fact that, in compositions with a relatively high bentonite content, i.e. compositions with slightly more than 2.0% by weight of bentonite, the property of being injection-moldable is diminished. Furthermore, the compositions do not mix well with water in the gunning lance if the bentonite content is relatively high. With the use of bentonite in the lower part of the above-mentioned range between 0.5 and 5% by weight, and with the simultaneous use of clay, both the spraying properties and the property of the composition to mix with water are enhanced.

According to another preferred embodiment, up to 40% by weight of the sintered magnesite and/or sintered dolomite, i.e. the refractory components in the composition, can be replaced by chromium ore. This embodiment is advantageous if, for certain application or certain steel grades or slags, a better pot life of the composition is to be achieved, i.e. less wear or less penetration of steel or slags during the use of the composition.

The compositions of the invention contain as a binder, in a manner known from the prior art, aluminum sulfate in a quantity of 1 to 5% by weight, preferably 2 to 4% by weight, calculated as anhydrous $Al_2(SO_4)_3$.

As an optional constituent, the mixes of the invention may contain up to 3% by weight, preferably up to 2% by weight, of magnesium sulfate, calculated as anhydrous $MgSO_4$.

The composition also contains 0.5 to 5% by weight of the alkaline earth component, which may be magnesium hydroxide, or the caustic-calcined MgO, or a mixture of these two materials. When a mixture of these two materials is employed, any proportion of the materials may be used. For example, the weight ratio of magnesium hydroxide to caustic-calcined MgO may be 1–99:99–1.

The caustic-calcined MgO product used in the composition or shapes of the invention is also a commercial product, which is obtained as a caustic-calcined seawater product by firing $Mg(OH)_2$ at relatively low temperatures, e.g. up to 1000° C., or as natural caustic-calcined product by firing naturally occurring magnesite. The fly ash of sintering furnaces, which also contains caustic fractions, can also be used as such caustic-calcined MgO product.

Instead of or in addition to the caustic-calcined Mgo the composition or shapes of the present invention may contain magnesium hydroxide as the alkaline earth component. This magnesium hydroxide is formed as an intermediate product in the production of a caustic-calcined seawater product.

A so-called dry mix compound is prepared from the above-mentioned constituents, for the production of gunapplied mixes, which is then applied by means of a gunning lance at the site of employment, where it is mixed with the required quantities of water in the gunning lance. The usual quantity of water in this case is from 8 to 20% by weight based on the dry weight of the composition. However, such a dry composition can also be mixed in a mixer with smaller quantities of water, between 4 and 8% by weight relative to the dry weight, and then shaped into a green article, i.e. formed but unfired ceramic bodies, e.g. by isostatic pressing in suitable molds. If necessary, these shapes can also be dried, e.g. at temperatures up to 150° C., but the drying can also take place by storage in the air. Such shapes have a relatively high dimensional stability and mechanical strength, so that they can be placed directly on pallets for shaping.

The refractory materials are used in the standard grain sizes, e.g. with a maximum grain size of 6 mm, preferably 4 mm and more preferably 2 mm.

The compositions and refractory unfired shapes of the present invention are particularly useful for production of linings for electric furnaces.

The invention will be discussed in greater detail with reference to the examples below.

EXAMPLE 1

A dry mix was prepared from the following constituents:

| Constituent | Weight % |
| --- | --- |
| Sintered magnesite, grain size up to 3 mm | 74.4 |
| Seawater magnesia sinter ("Meerwassersinter"), grain size up to 2 mm | 22.3 |
| Caustic-calcined MgO | 0.7 |
| $Al_2(SO_4)_3$ | 1.9 |
| Bentonite | 0.7 |

This dry mix was mixed in a gunning lance with 12 weight parts of water relative to 100 weight parts of the dry mix, and could be coated, in continuous application, with a layer thickness of 10 cm or more, on a vertical wall of an electric furnace.

EXAMPLE 2

A dry mix was prepared from the following constituents:

| Constituent | Weight % |
| --- | --- |
| Seawater magnesia sinter, grain size up to 2 mm | 92.1 |
| Caustic-calcined MgO | 2.6 |
| $Al_2(SO_4)_3$ | 2.0 |
| Bentonite | 1.3 |
| Refractory clay | 1.3 |
| $MgSO_4$ | 0.7 |

This dry mix could also be applied with an injection-molding thickness of 10 cm or more.

The same dry mix was mixed in a mixer with 6 weight parts of water relative to 100 weight parts of the dry mix, and pressed in an isostatic press to shapes with the dimensions of $250 \times 125 \times 65$ mm at a pressure of 100 $N/mm^2$. These shapes were dried at 130° C. and were then able to be stacked on a pallet for transportation.

EXAMPLE 3

First, a dry mix was prepared from the following constituents:

| Constituent | Weight % |
| --- | --- |
| Sintered dolomite, grain size up to 2 mm | 66 |
| Chromium ore (Transvaal), grain size up to 2 mm | 24 |
| Caustic-calcined MgO | 4.0 |
| $Al_2(SO_4)_3$ | 3.5 |
| Bentonite | 0.5 |
| Refractory clay | 2.0 |

The dry mix could be applied as a molding compound with 13 weight parts of water relative to 100 weight parts of the dry mix.

I claim:
1. A refractory composition which comprises:
    at least 50% by weight of a sintered material selected from the group consisting of sintered magnesite, sintered dolomite and a mixture thereof,
    0.5 to 5% by weight of bentonite,
    1 to 5% by weight of aluminum sulfate, and '0.5 to 5% by weight of an alkaline earth component selected from the group consisting of magnesium hydroxide, caustic-calcined MgO and a mixture thereof, all of said weight percentages being based on the weight of said composition,
    said composition not containing any phosphate bonding agent.
2. The composition according to claim 1, wherein a positive amount of up to 40% by weight of the refractory components in said composition is chromium ore.
3. The composition according to claim 1, which further comprises 0.5 to 4% by weight of refractory clay in addition to said bentonite, based on the weight of refractory components in said composition.
4. The composition according to claim 1, which further comprises a positive amount of up to 3% by weight of magnesium sulfate based on the weight of said composition.
5. The composition according to claim 1, wherein said alkaline earth component is magnesium hydroxide.
6. The composition according to claim 1, wherein said alkaline earth component is caustic-calcined MgO.
7. The composition according to claim 1, wherein said alkaline earth component is a mixture of magnesium hydroxide and caustic-calcined MgO.
8. The composition according to claim 1, wherein the amount of said sintered material is 50 to 95% by weight of said composition.
9. The composition according to claim 1, wherein the refractory components in said composition have a maximum grain size of 6 mm.
10. A refractory, unfired shape comprising the composition of claim 1.

* * * * *